Patented June 8, 1937

2,083,302

UNITED STATES PATENT OFFICE 2,083,302

MANUFACTURE OF CANNED REFRESHING FOOD

Kintaro Kimura, Tokyo-Shi, Japan

No Drawing. Application June 15, 1936, Serial No. 85,433. In Japan July 10, 1935

1 Claim. (Cl. 99—182)

This invention relates to the manufacture of canned refreshing food comprising one or more kinds of jellies in any desired shape, vegetables and fruits.

When gelatine, pectin, agar-agar, Japanese isinglass, or gelidium jelly are used as articles of the canned food, it has heretofore been found impossible to keep them in jellies of any desired shape due to a high temperature for sterilization, so that no canned refreshing food of such kind is commercially manufactured. This disadvantage is improved by my invention.

According to my invention, material standing in need of a heat treatment at a high temperature exceeding 100° C. is previously treated at such a temperature and then jelly pieces in any desired shape are added thereto with or without other material in a tin can, which jelly has been subjected to satisfactory heat sterilization at a high temperature on its preparation, and the contents in the tin can are subjected to heat sterilization at relatively low temperature.

In carrying my invention into effect by way of example, first, a suitable amount of steeped peas and treacle is put in a suitable tin can, and is subjected to a heat treatment at a temperature of about 115°–118° C. for about one hour in a sterilizing-pot. Next, a suitable amount of jelly pieces in desired shape, such as small cubes, and pieces of suitable fruits and cakes are added thereto and enclosed in a tin can by means of a provisional seaming means, and air is expelled from the tin can. Finally the tin can is tightly sealed by seaming means and subjected to a heat sterilization at a temperature of 70°–80° C. in hot water for about one hour, and then is rapidly cooled. It will be noted that the jelly is previously prepared in any suitable manner subjecting to a heat treatment at a high temperature, so that it is satisfactorily sterilized.

I do not intend to limit myself to the exact details above described, since it is obvious that various modifications and changes can be made without departing from the nature of the invention.

Having now particularly described and ascertained the nature of my said invention and in what manner the same is to be performed. I claim:—

A method for the manufacture of canned refreshing foods which consists in first subjecting steeped peas to a heat sterilization at a temperature exceeding 100° C., next, adding treacle, jelly pieces in desired shape with or without other material, such as pieces of fruits and cakes thereto in a tin can, and expelling air from the tin can, finally, tightly sealing the tin can and subjecting to a heat sterilization at a relatively low temperature such as 70°–80° C. and rapidly cooling the same.

KINTARO KIMURA.